(12) United States Patent
Uphues et al.

(10) Patent No.: US 11,987,456 B2
(45) Date of Patent: May 21, 2024

(54) GRIPPING UNIT FOR A BASE

(71) Applicant: KHS GmbH, Dortmund (DE)

(72) Inventors: Simon Uphues, Kleve (DE); Lothar Wess, Kleve (DE); Oliver Heisig, Kleve (DE); Bernd Cox, Weeze (DE); Christopher Stuhlmann, Korbach (DE)

(73) Assignee: KHS GmbH, Dortmund (DE)

( * ) Notice: Subject to any disclaimer, the term of this patent is extended or adjusted under 35 U.S.C. 154(b) by 559 days.

(21) Appl. No.: 17/282,910

(22) PCT Filed: Oct. 22, 2019

(86) PCT No.: PCT/EP2019/078640
§ 371 (c)(1),
(2) Date: Apr. 5, 2021

(87) PCT Pub. No.: WO2020/088980
PCT Pub. Date: May 7, 2020

(65) Prior Publication Data
US 2022/0009726 A1   Jan. 13, 2022

(30) Foreign Application Priority Data
Oct. 31, 2018   (DE) .................. 10 2018 127 266.9

(51) Int. Cl.
| | | |
|---|---|---|
| *B65G 47/90* | (2006.01) | |
| *B25J 9/00* | (2006.01) | |
| *B25J 15/00* | (2006.01) | |
| *B25J 15/10* | (2006.01) | |

(52) U.S. Cl.
CPC .......... *B65G 47/904* (2013.01); *B25J 9/0093* (2013.01); *B25J 15/0033* (2013.01); *B25J 15/10* (2013.01)

(58) Field of Classification Search
CPC .. B65G 47/902; B65G 47/904; B25J 15/0033; B25J 15/0095; B25J 15/022; B25J 15/10; B25J 9/0093
USPC ........................................................ 294/86.4
See application file for complete search history.

(56) References Cited

U.S. PATENT DOCUMENTS

| | | | | |
|---|---|---|---|---|
| 4,293,272 A * | 10/1981 | Jellema | .................. | B65G 57/04 |
| | | | | 414/416.06 |
| 4,355,936 A * | 10/1982 | Thomas | .................. | B65G 47/91 |
| | | | | 414/797 |
| 5,199,845 A * | 4/1993 | Hirashima | ............. | B65G 47/90 |
| | | | | 414/744.1 |
| 6,082,080 A * | 7/2000 | Holter | .................. | B25J 15/0273 |
| | | | | 414/789.5 |
| 6,923,486 B1 * | 8/2005 | Slagman | ................ | B65G 47/90 |
| | | | | 294/115 |

(Continued)

FOREIGN PATENT DOCUMENTS

| | | |
|---|---|---|
| DE | 69306083 T2 | 4/1997 |
| DE | 102009016371 A1 | 9/2010 |
| EP | 0594476 A1 | 4/1994 |

(Continued)

*Primary Examiner* — Dean J Kramer
(74) *Attorney, Agent, or Firm* — Occhiuti & Rohlicek LLP (57) ABSTRACT

A gripping unit grips a base having a thickness that is defined by an upper side and a lower side thereof and that conveys a product on the upper side. The gripping unit has a pair of first guides with corresponding guide surfaces in contact with the base. The guide surfaces extends as far as beneath the lower side of the base.

22 Claims, 5 Drawing Sheets

(56) References Cited

U.S. PATENT DOCUMENTS

2005/0220599 A1    10/2005   Job et al.
2015/0246444 A1     9/2015   Guidi et al.

FOREIGN PATENT DOCUMENTS

| | | |
|---|---|---|
| EP | 1886772 A1 | 2/2008 |
| GB | 2083789 A | 3/1982 |
| JP | 2002103268 A | 4/2002 |
| NL | 2003892 C2 | 6/2011 |
| WO | 00/71450 A1 | 11/2000 |
| WO | 2013055211 A1 | 4/2013 |
| WO | 2017027909 A1 | 2/2017 |

* cited by examiner

GRIPPING UNIT FOR A BASE

RELATED APPLICATIONS

This is the national stage of international application PCT/EP2019/078640, filed on Oct. 22, 2019, which claims the benefit of the Oct. 31, 2018 priority date of German application DE 102018127266.9, the contents of which are incorporated herein by reference.

FIELD OF INVENTION

The invention relates to conveying products and in particular, to conveying products that are to be assembled into layers on a pallet.

BACKGROUND

During the unpacking or packing of products, the products are often conveyed on a base. The base is typically made of paper, cardboard, or film. In some cases, the base is a plate.

While the products can themselves be held reliably by grippers, it is all too common to lose contact with the base. This often happens when rotating or pivoting about a vertical axis. From that point on, the base interferes with the conveying of the products. In some cases, the base becomes damaged and the conveying system as a whole is impaired.

Unfortunately, when palletizing products, the above-mentioned pivoting or rotation about a vertical axis occurs frequently. When this happens, the products are no longer conveyed in the correct predefined relation relative to the base.

SUMMARY

The object of the invention is therefore to propose a device and a method with which the product(s) being conveyed on a base are reliably conveyed in a predefined relation to the base, and in particular are rotated or pivoted about a vertical axis.

A gripper unit for a base on which products are conveyed is matched to a base, which is predefined by an upper side and a lower side of the base. Products are conveyed on the upper side of the base. The gripper unit comprises at least one first guide, with a guide surface bearing against the base, which extends as far as beneath the lower side of the base.

The base is usually made of paper, cardboard, or plastic. It is usually flat and strong enough to carry the products standing upright not only when at rest but when being conveyed. This often occurs when groups of individual products are being conveyed to a device for repacking into bundles. The base usually has a thickness between half a millimeter and ten millimeters.

Since the products are generally standing upright on the base without being connected to it, acceleration or braking can shift the products relative to the base. The base can sometimes be pulled away from under the products as a result of such relative movements. This interferes with conveying the products. For example, it is possible for the base or parts of it to become caught in the conveying device.

As used herein, "products" includes containers such as bottles, sachets, glasses, or the like, and also items conveyed in surrounding packaging, such as cartons containing individual products, six-packs, or beverage boxes. Such products typically stand upright on the base, i.e. the products stand with their vertical axis, hereinafter also designated as the height axis, orthogonally on the base.

The gripper unit comprises a first guide. The first guide ensures that the base is guided and conveyed in exactly the same direction and at the same speed as the products that stand on the base. The first guide extends as far as the lower side of the base. It is sufficient if the first guide extends by one to five millimeters under the underside of the base. This simple measure reduces the risk of folding or compressing of the base as well as a movement of the products relative to the base.

The first guide is preferably located in the form of points or lines on the edge of the base. The first guide is accordingly configured as a bar or a sequence of bars for point-by-point contact with the edge of the base or as a contact surface for the edge of the base in order to produce a guide in linear form. The preference is for a wide contact surface, which ensures a linear guide for a side of the base.

The first guide can be in contact at any point of an edge of the base. Preferably, however, the first guide is in contact at a corner region of the base.

According to one advantageous embodiment of the invention, the gripper unit comprises a first guide pair, which is equipped with two first guides, wherein in each case a first guide on one side of the base is in contact at an edge, wherein the guide surfaces of the two first guides are arranged at an angle to one another. With such a first guide pair, in particular the corner of a base can be guided, at which two edges of the base meet one another at an angle. The guides of the first guide pair are advantageously secured to a carrier of the gripper arm, and are in a fixed relation to one another, such, in the event of the rotating or pivoting of the base, a corner of a base, with the products being conveyed on it, can be reliably guided.

The guide arrangement is particularly well-suited for bases that are rigid enough to be guided by a small portion, such as a corner. These permit use of a guide which is small in relation to the base without the base being bent, deformed, or folded in on itself. The first guide is preferably arranged on a carrier that extends from above in the direction towards the base.

The first guide is secured to the carrier, in most cases by screws, clamps, pins, bolts, or other detachable or non-detachable securing means. The carrier connects, on the other side, the gripper unit, for example to a gripper.

Preferably, the gripper unit is configured so as to be capable of pivoting and/or to be height adjustable by means of a lever arrangement. The lever arrangement can be arranged directly at the first guide but is preferably arranged at the carrier such that the gripper unit can be adjusted in height and/or pivoted by the lever arrangement by raising or lowering of the carrier. As an alternative, the carrier itself can be configured as height adjustable. The lever arrangement is advantageous in ensuring the guiding and conveying of the base when pivoting or rotating.

In some embodiments, the gripper unit comprises a finger, which is arranged at a free end of the guide, preferably immediately beneath the contact surface, and which extends orthogonally to the guide, wherein the finger is configured in the form of a plate and comprises an upper side that is configured so as to receive the base. The finger is intended to engage beneath an edge region of the base, such that the base is in contact on the upper side of the finger. It is sufficient for only an edge region of the base to be engaged beneath in order to ensure that the base still remains in the predefined relation to the products, in particular when pivoting or rotating about a vertical axis.

The finger of the gripper unit is preferably configured with a flat upper side and can be made of any material that can resist the forces imposed. The finger is usually made of metal. The upper side of the finger in most cases has a surface area of between five square centimeters and four hundred square centimeters. The upper side of the finger can have different contours, depending on the requirements of the base that is to be conveyed and the products arranged on it. The contour can accordingly be angular or round at least in some areas. If it is intended that the finger engage beneath a corner region of a base, then the upper side of the finger can be configured in an angular shape such that peripheral regions of the two edges that form the corner region of the base can be reliably grasped.

The finger is preferably configured as full-surfaced, but may have apertures in order, for example, to economize on material. If apertures are provided, they are preferably small to reduce the risk of having an edge or a corner of the base catch in the apertures.

In order to ensure a problem-free engagement with the edge or corner of the base, the edge of the finger that faces towards the base is preferably broken or rounded.

The gripping unit according to the invention functions particularly well if linear conveying is involved.

A preferred embodiment of the gripping unit includes a securing element that secures the base at the finger of the gripping unit during the conveying process. The securing element also serves to guide the base reliably if the base is pivoted or rotated with products arranged on it. This securing element is not dependent on the positioning of the products on the base. It can be guaranteed to function with a finger with small surface area. The securing element allows for the guiding of bases that have less bending stiffness. Such bases, such as paper or film, in contrast to more rigid bases made of card or cardboard, can be guided better with a securing element during pivoting or rotating movements without folding or compression of the base occurring.

The securing element can be provided in a simple manner by a clamp, configured, for example, as a spring that presses the base onto the upper side of the finger. The securing element can also be configured as a pressure stamp or lever.

According to one simple embodiment of the gripping unit, the surface of the upper side of the finger is dimensioned to be sufficiently large for a product to be grasped by the finger from beneath. The finger is then raised slightly by the lever arrangement, just far enough for the weight of the product to press the base onto the upper side of the finger and fix it there. It is only necessary to raise the finger by a few millimeters and, as a rule, by a height no greater than the thickness of the base. This reduces the risk of damaging the base. At the end of the conveying of the base, the finger is lowered and is ready for a new conveying procedure.

In some embodiments, the gripping unit is secured to the guide by a joint or a hinge such that the first guide can be pivoted or folded. The position of the joint or hinge can be controlled to transition between a closed and an open setting. In this way, the first guide can secure and guide the base at the beginning of the conveying procedure by the closing of the joint or hinge, while at the end of the conveying procedure, the gripping unit with the first guide releases the base by the opening of the hinge.

In some aspects, the invention features a gripper for the conveying of products that are on a base, with at least one gripping unit for conveying the base, as has been described above. The gripper is preferably arranged above the product and the base. A vertical axis of the gripper preferably coincides with the vertical axis of the product or runs parallel to it. The gripper can convey a product, but it may also convey two or more products, which are in each case standing on their respective bases. Typically, therefore, a gripper conveys two or four six-packs with bottles, or conveys cans that are intended to be stacked on a pallet.

According to a further configuration, the gripper comprises a first and a second gripping unit, in each case with a first pair of guides, that are arranged diagonally opposite one another. If the base is being guided at two diagonally opposed corners, a rotation or pivot movement about a vertical axis can take place particularly free of any difficulties.

The gripper has at least one, and preferably up to four, gripping units, in each case with a second guide for engagement with the products. The second guides therefore do not extend as far as beneath the base. The second guides, which in most cases are in contact with the side walls of the products, ensure a secure guiding of the products. The second guides are preferably arranged opposite one another.

In some embodiments, the second guide comprises a contact surface that is enlarged opposite the guide, in particular being wider than the guide. The contact surface of a second guide extends orthogonally to the base. The height and width of the contact surface of a second guide are adjusted to the dimensions of the product that is to be conveyed. The second guide preferably comprises a contact surface with a large area.

The gripper is movable. It follows the products that are to be conveyed, which are securely grasped by the contact surfaces of the first and second guide or guides and are also guided by them. The gripping units with a first guide are preferably arranged at the corners of a base, in particular at diagonally opposite corners of a base. They can, however, also be arranged laterally at the edges of a base. The gripping units are connected to the gripper by the carrier. The control unit of the gripper, which, for example, determines the speed of the gripper, but which also controls the opening and closing of the contact surfaces, likewise controls the gripping units with a first or a second guide, in particular the raising and lowering of a lifting element, typically configured as a lever arrangement, or the closing and opening of a joint or hinge.

Some embodiments include a conveying device that comprises a gripper as described above and a transporter.

The transporter can be configured as a circulating band of elastic flexible material, as a band formed of individual band sections, mostly overlapping one another, as a conveyor chain, as a roller or roll train, also with driven rollers or rolls, or in any other desired manner. The transporter can be made up of individual sections, for example as a sequence of conveyor belts or chains. The transporter can contain linear sections, but also sections with a radius, on which bases and products are conveyed along a curved path. The transporter can also contain sections in which the bases and the products can be pivoted or rotated.

The gripper follows such sections in which bases and products are pivoted or rotated, or the gripper is arranged in such sections in a fixed position or movable. Preferably, the gripper rotates bases and products inside such sections relative to the transporter.

The gripper is, in most cases, arranged above the transporter, wherein the second guides engage the product, in each case laterally with the contact surface, and wherein the at least one gripping unit with the first guide extends along the product as far as beneath the base.

Since the gripping unit according to the invention extends beneath the base, according to one preferred embodiment the transporter comprise cut-out openings, which, during the conveying of a base with products arranged on it, are engaged through by the gripping unit, or into which the gripping unit is inserted.

The cut-out opening has dimensions that allow for a pivoting or rotation of the base with the product. With this embodiment, the transporter and gripper is synchronized with the gripping unit arranged in their location. The gripping unit must be positioned above a cut-out opening, so that it can grip the base securely. The gripper and transporter then move at the same speed to convey the products the products arranged on the base. The synchronous allocation and arrangement of gripper and transporter can be ensured, for example, by a control unit, which receives signals by way of sensors which signal the correct arrangement of the gripper in relation to the transporter. Typical sensors can be optical sensors.

The invention further comprises a method for the conveying of products on a base, at least with the steps: positioning of a gripper with at least one gripping unit, which comprises a first guide, above the products located on the base, wherein products and base stand on a transporter, pivoting of the gripping unit to contact the products, and conveying, in particular rotating or pivoting of the products held by the gripper, and of the base, likewise held by the gripper, on the transporter, about a vertical axis.

The method for the conveying of products on a base comprises the step of the products on the base being engaged by a gripper with at least one gripping unit. In this situation, the at least one contact surface of the gripper bears against at least one base. As a rule, the first contact surface is in contact with the base laterally, in region of a corner. The gripper can comprise at least one gripping arm with a second contact surface. Preferably, a second contact surface is in contact on a side surface or side wall of the product, or, if the base is a constituent part of a surrounding packing arrangement, which at least partially envelopes the product, then it is in contact with the surrounding packing. Preferably, gripping arms are in contact with second contact surfaces on all the side walls of the product or its surrounding packing, and at least two gripping arms are in contact with a first contact surface at diametrically opposed corners of the base. In this way the products are securely conveyed and guided.

Inasmuch as the gripping unit with the first guide comprises a finger, the base is now arranged on or above the upper side of the finger of the gripping unit. The gripping unit is optionally raised by a lever, in particular by a lever arrangement, at least as far as the contact of the upper side of the finger with the base. In this situation the first guide of the gripping unit is in contact with the base, in particular with an edge of the base. The method according to the invention further comprises the conveying, in particular the rotating or pivoting of the product held by the gripper about a vertical axis of the products.

If the gripping unit comprises a first guide and, additionally, a finger and a securing element, the conveying, in particular the rotating or pivoting, takes place with the base secured by the second finger and the securing element. According to one advantageous further embodiment of the method according to the invention, the finger of the gripping unit is raised sufficiently high until a product which is located on the base above the finger secures the base to the finger due to its own weight.

According to an alternative embodiment, the base is secured to the gripping unit by means of a securing element, in particular a securing element which secures the base to the finger. Suitable securing elements have been described heretofore.

BRIEF DESCRIPTION OF THE DRAWINGS

Details of embodiments of the invention are explained more closely hereinafter on the basis of figures. These show.

DETAILED DESCRIPTION

Figure 1:
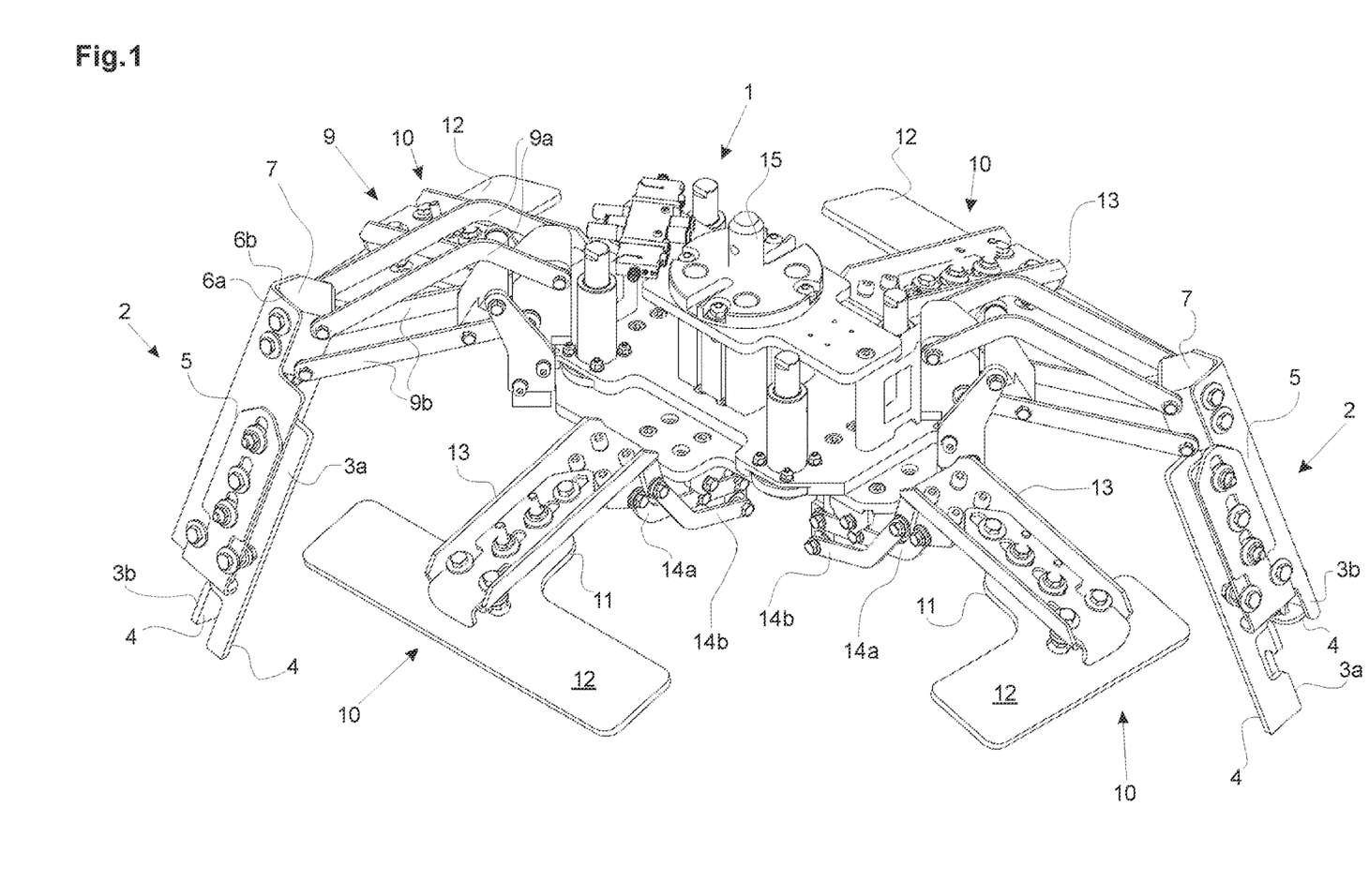
FIG. 1 shows a perspective view of a gripper.

FIG. 1 shows a preferably metal gripper 1 with a pair of first gripping units 2, each of which comprises a pair of first guides 3a, 3b.

Figure 2:
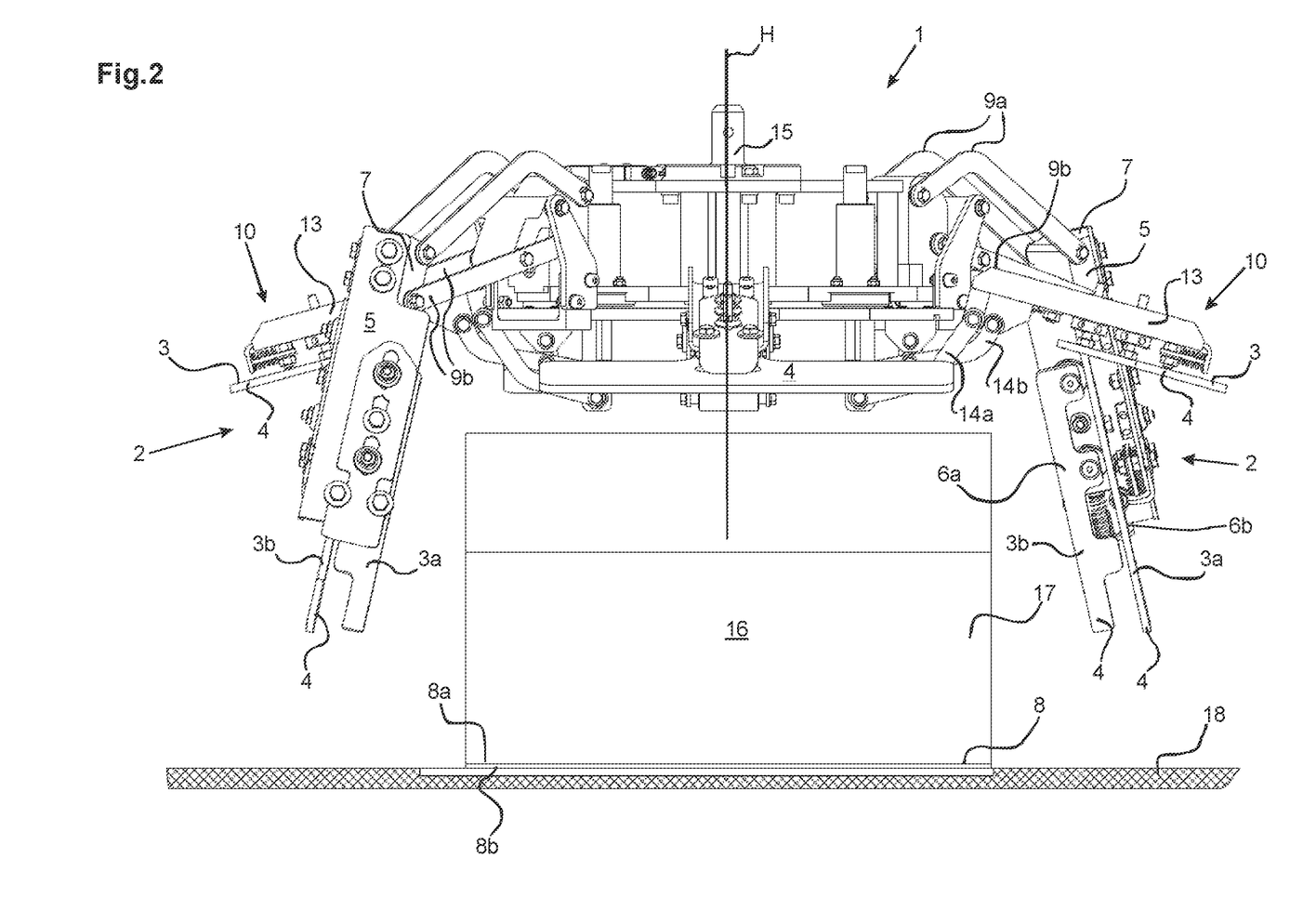
FIG. 2 shows a perspective view of the gripper of FIG. 1 with a product that is on a conveying device.

As shown in FIG. 2, each first guide 3a, 3b faces a product 16 that is to be conveyed. As used herein, the term "product" includes any surrounding packaging thereof. Each first guide 3a, 3b comprises a first contact surface 4 at a free end of its corresponding first guide 3a, 3b. The first contact surface 4 thus serves as a guide surface.

Figure 3:
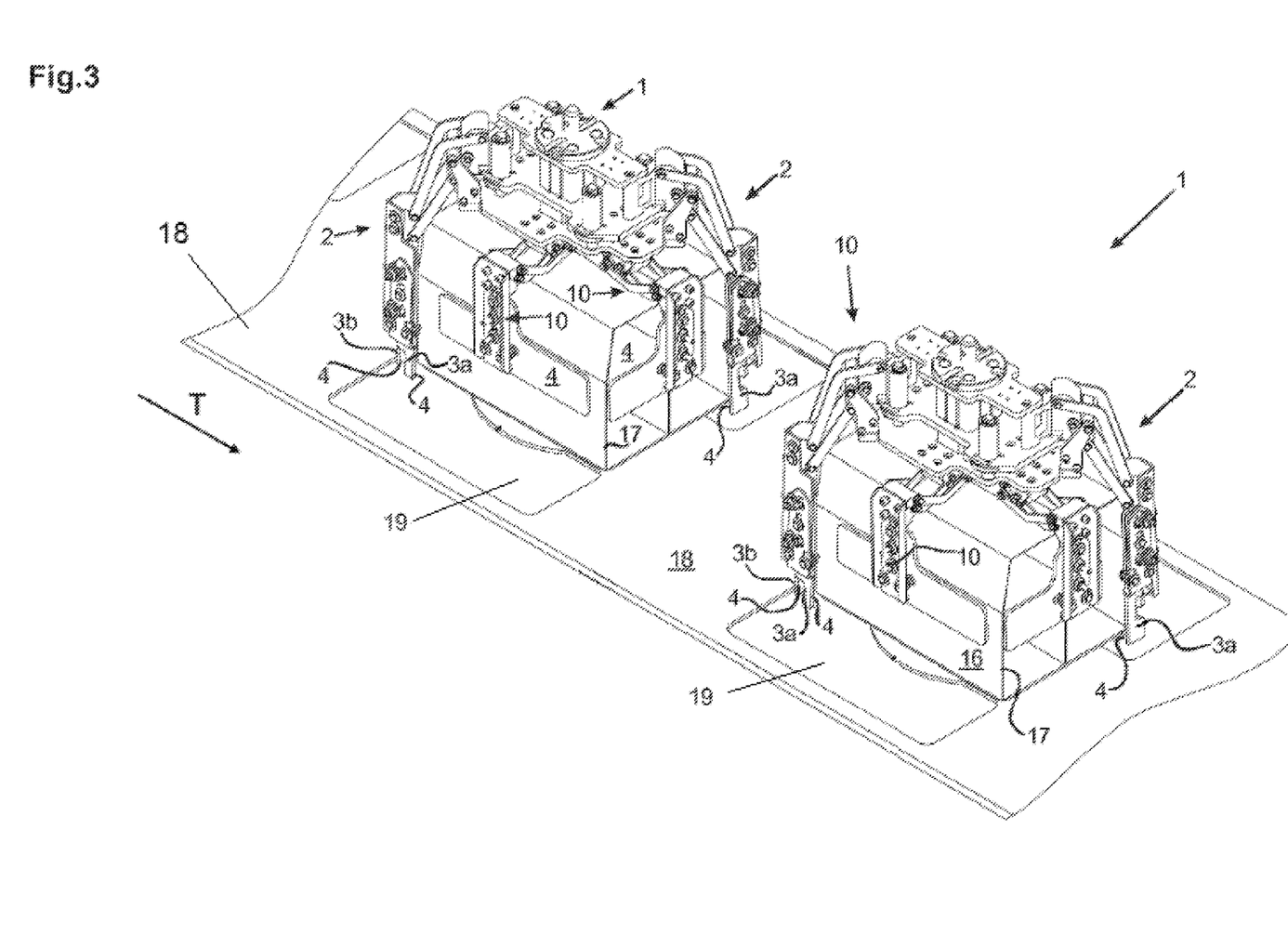
FIG. 3 shows a perspective view of two grippers of the type shown in FIG. 1 disposed above a conveyor.
Figure 4:
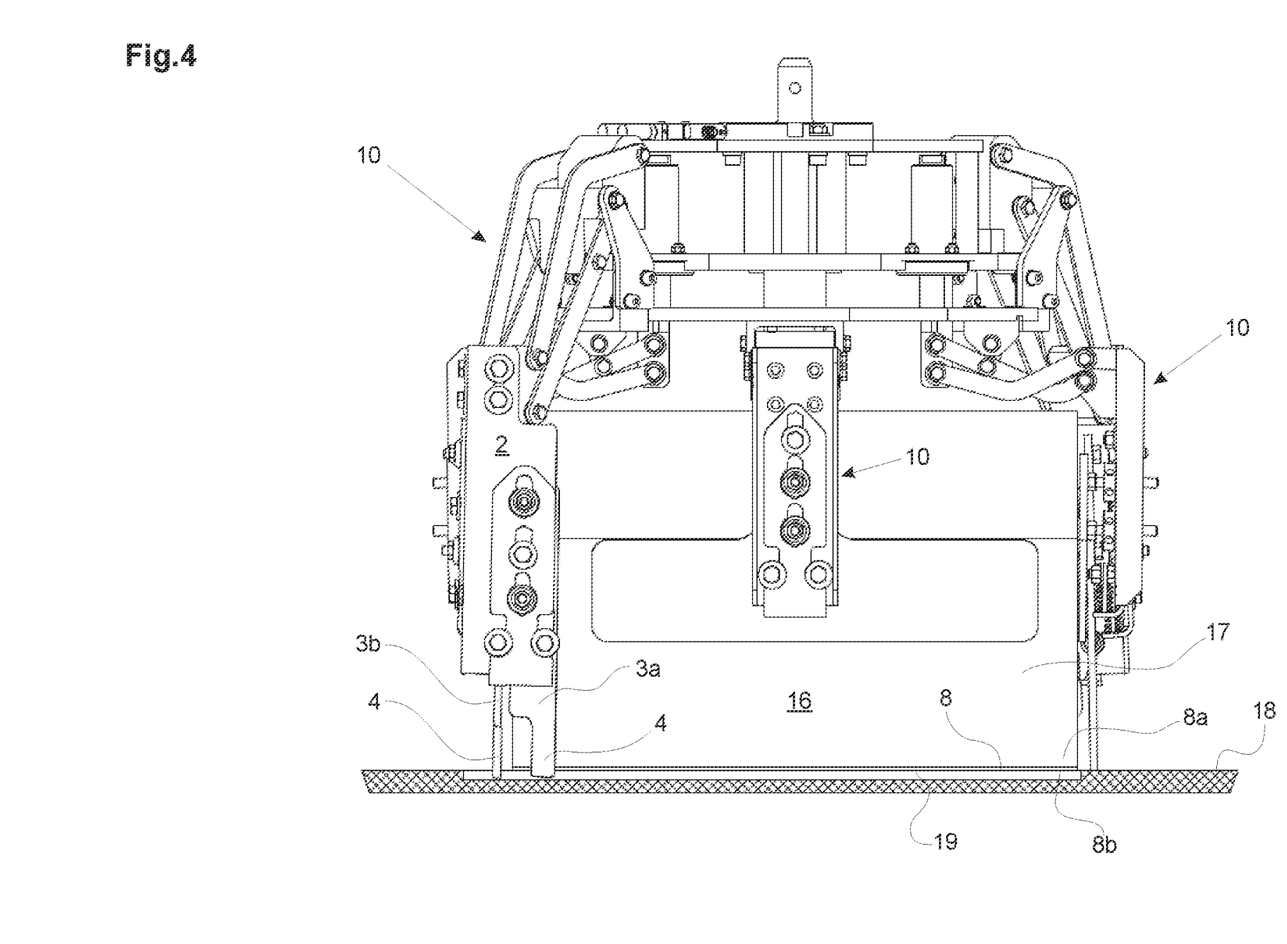
FIG. 4 shows the gripper of FIG. 2 in a closed position.

The pair of first guides 3a, 3b is arranged on a first carrier 5 that has a pair of angle sections 6a, 6b to which a corresponding one of the first guides 3a, 3b is secured. As a result, there exists a corresponding angle between the first guides 3a, 3b. As shown in FIGS. 3 and 4, the angle enables the first guides 3a, 3b to contact a corner of a base 8.

FIG. 1 also shows a lever arrangement 9 that functions as a lifting element. The lever arrangement 9 features upper and lower pairs of levers 9a, 9b, both of which are arranged between the gripper 1 and the first carrier 5. The levers 9a of the upper pair are bent to form an angle. The levers 9b of the lower pair, on the other hand, are straight. The lever arrangement 9 permits the first carrier 5 to be raised and lowered by being pivoted.

FIG. 1 further shows that the first gripping units 2 are arranged diametrically opposite one another. As a result, the first gripping units 2 engage opposite corners of the base 8. This avoids having the base 8 relative to the products 16 standing on it.

The gripper 1 further comprises four second gripping units 10 that are configured to contact side surfaces of the product 16. Second carriers 13 support each of the second gripping units 10.

Each second gripping unit 10 comprises a guide 11 with a second contact surface 12. The second contact surface 12 is wider than the second carrier 13. As a result, the second gripping unit 10 securely contacts the product 16.

Each of the second gripping units 10 connects to a corresponding second pair of levers 14a, 14b, which are mounted at the gripper 1. The second pair of levers 14a, 14b enables the second gripping unit 10 to which it is connected to be pivoted so as to move up or down.

Each guide 3a, 3b, 11 is secured to its corresponding carrier 5, 13. Embodiments include those in which guide 3a, 3b, 11 is secured detachably and those in which it is not. Among the embodiments are those in which the guide 3a, 3b, 11 is secured by screws, plugs, and/or clamps. Detachably secured guides 3a, 3b, 11 are preferred since they can be more easily replaced.

The gripper 1 comprises a receiver 15, with which it is arranged so as to be translated at the same speed and direction as the conveyor belt 18 shown in FIGS. 2 and 3 and to be rotated relative to that conveyor belt 18. As shown in FIG. 2, a vertical axis H of the products runs parallel to that of the receiver 15.

In operation, the gripper 1 translates at the same speed and in the same transport direction as the conveyor belt 18 shown in FIGS. 2 and 3. However, the gripper 1 can also rotate or pivot the base 8, with the products 16 arranged on it, at any time. A control unit controls both movement of the first and second gripping unit 2, 10, and rotation of the gripper 1.

FIG. 2 shows the gripper 1 located above the product 16 and configured to be in an opened state.

In some embodiments, a product 16 comprises two groups of six bottles each, i.e., two sixpacks, which are enveloped by an outside packaging arrangement and move as a unit. The base of the packaging arrangement forms the base 8. The packaging arrangement likewise comprises an upper side 8a and a lower side 8b. The base 8 is therefore a multi-part structure. As shown in FIG. 3, the packaging arrangement also forms the side walls 17 of the product 16.

As can be seen in FIG. 2, the second gripping units 10, are arranged on one side of the product 16 and have been raised sufficiently high for the product 16 to be freely movable relative to the gripper 1. In an alternative, the entire gripper 1 can be raised, and moved freely relative to the product 16.

The first gripping units 3 have also been raised. However, the contact surfaces 4 are still at the height of the side walls of the product 16. Nevertheless, this does not impede relative movement between the product 16 and the gripper 1.

FIG. 3 shows a perspective view of two grippers 1, both of which are in contact with corresponding products 16 that are standing on a conveyor belt 18 as they are being transported in a transport direction T. These products 16 are to be assembled in alternating arrangements to form a layer of a pallet. Once so assembled, the products 16, which have been formed into a layer for the pallet, are then placed on the pallet.

The foregoing assembly of products 16 into a pallet layer may require that some products 16 be rotated. It is the gripper 1 that carries out the required rotation.

As noted above, the gripper 1 moves at the same speed and in the same transport direction T as the products 16. Each gripper's second gripping units 10 contacts a corresponding one of the product's side walls 17. The four second gripping units 10 collectively contact all four side walls 17, including those parallel to the transport direction T and those perpendicular to the transport direction T. The second gripping unit's contact surfaces 4, being wider than their corresponding carriers 13, guide the product 16 securely. The first gripping units 2 are arranged diametrically opposite one another to engage diagonally-opposite corners of the product 16. The guides 3a, 3b, with the contact surfaces 4, extend as far as beneath the base 8, i.e. as far as beneath the product 16. This arrangement securely guides two diagonally-opposed corners of the base 8.

FIG. 4 shows a product 16 that has been engaged by the gripper 1, as seen from a point-of-view that faces the transport direction T. It is apparent from FIG. 4 that the guides 3a, 3b of the first gripping units 2 extend as far as under the base 8 of the product 16. Accordingly, the guides 3a, 3b extend below the plane of the conveyor belt 18. To permit this, the conveyor belt 18 has an opening 19, which is also visible in FIGS. 2 and 3. It is therefore important for the product 16 to have been placed on the conveyor belt 18 in exactly the correct relation to the openings 19 on the conveyor belt 18. This exact placement will enable the guides 3a, 3b to extend into the opening 19 as shown.

Figure 5:
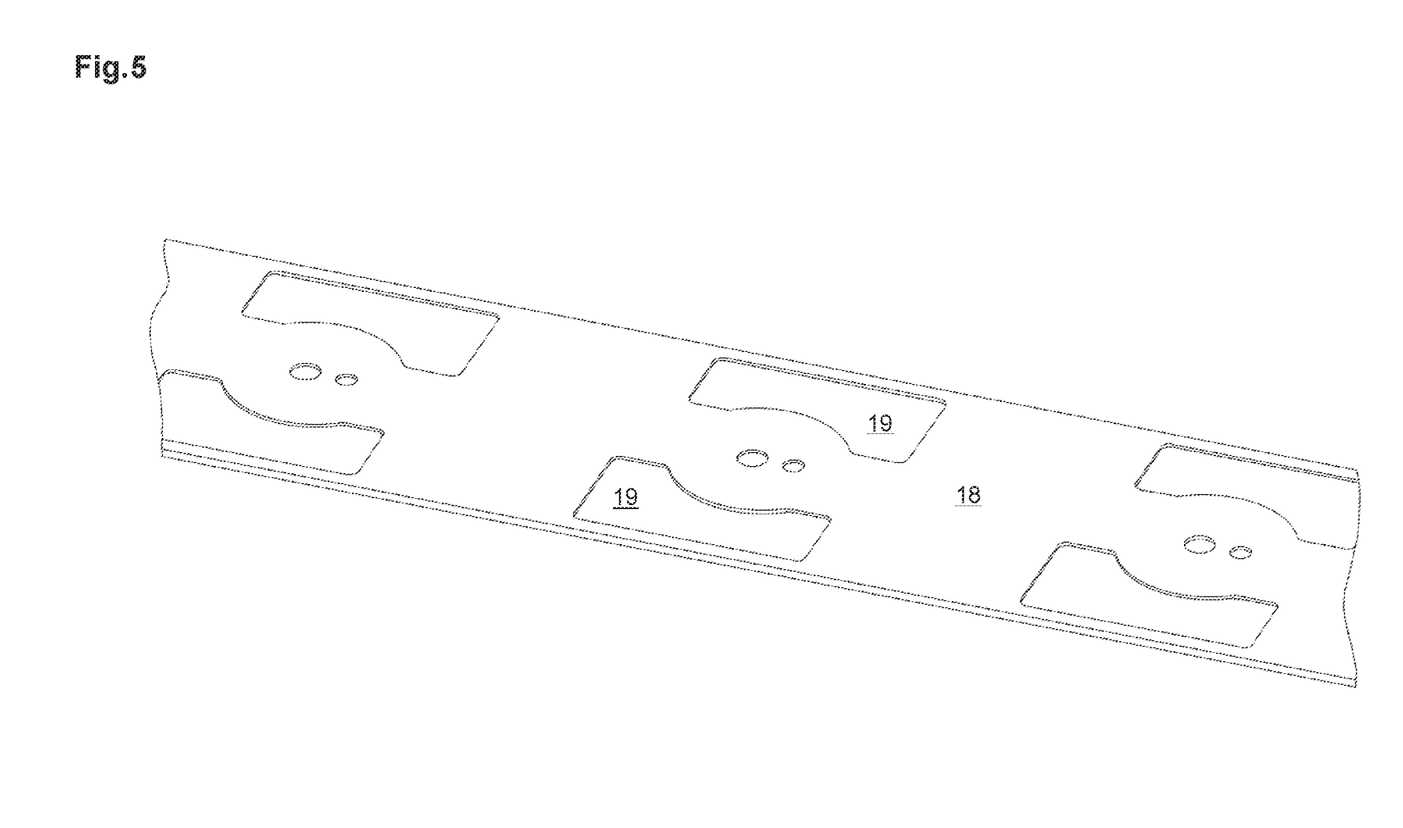
FIG. 5 shows a conveyor belt with cut-out openings.

FIG. 5 shows an unobstructed view of the openings 19 along the conveyor belt 18. The openings 19 are dimensioned in such a way that the entire movement sequence of a rotation or a pivoting of the gripper 1 with the first gripping units 2, of which the guides 3a, 3b extend as far as beneath the base 8 of product 16, can be carried out without interrupting the transporting of the product on the conveyor belt 18. The openings are therefore at least as long or as wide as the product 16 with the guides 3a, 3b in contact. The opening 19 allows for a rotation or a pivoting of the product 16 by up to 180° in relation to the transport direction T.

The invention claimed is:

1. An apparatus comprising a gripper comprising a gripping unit for a base, said base having a thickness that is defined by an upper side and a lower side thereof, wherein a product is conveyed on said upper side of said base, wherein said gripping unit comprises a pair of first guides with corresponding guide surfaces in contact with said base, wherein said guide surfaces extend as far as beneath said lower side of said base, said apparatus further comprising a transporter that defines a plane that supports said base and that conveys said base with products arranged thereon, wherein said transporter comprises a cut-out opening for said gripping unit, wherein said cut-out opening leads into a recess that extends below said plane of said transporter, thereby permitting said guide surfaces to extend beneath said plane.

2. The apparatus of claim 1, wherein said guide surface comprises one of a bar and a flat surface.

3. The apparatus of claim 1, wherein said guide surfaces define an angle therebetween.

4. The apparatus of claim 1, wherein said gripping unit is one of a pair of gripping units that are diagonally opposite each other.

5. The apparatus of claim 1, wherein each of said first guides forms a plate-shaped finger that comprises an upper side that is disposed to contact said lower side of said base.

6. The apparatus of claim 1, wherein each of said first guides forms a finger that has a cornered, angular, or rounded section.

7. The apparatus of claim 1, wherein said each of said first guides forms a finger that comprises an edge that has a broken section.

8. The apparatus of claim 1, wherein said base is secured at a finger formed in said first guide when said base is being conveyed.

9. The apparatus of claim 1, wherein said gripping unit comprises a carrier to which said pair of first guides is secured.

10. The apparatus of claim 1, wherein said gripping unit is a height-adjustable gripping unit that further comprises a lever arrangement for adjusting a height of said gripping unit.

11. The apparatus of claim 1, wherein said gripping unit further comprises a joint or hinge at a carrier to which said pair of first guides is secured.

12. The apparatus of claim 1, wherein said gripping unit is one of a plurality of identical gripping units of a conveyor for conveying products.

13. The apparatus of claim 1, wherein said gripping unit further comprises a second guide, wherein said second guide is disposed to contact a side surface of a product that is being conveyed on said base.

14. The apparatus of claim 1, wherein said gripping unit further comprises a plurality of second guides, each of which is disposed to contact a corresponding side surface of a product that is being conveyed on said base.

15. The apparatus of claim 1, wherein said gripping unit further comprises a plurality of second guides, each of which comprises a contact surface and a carrier that is attached to said contact surface, wherein said contact surface is wider than said carrier.

16. The apparatus of claim 1, wherein, in operation, said gripper is arranged above said base.

17. The apparatus of claim 1, wherein each of said first guides forms a finger that comprises an edge that has a flattened section.

18. The apparatus of claim 1, wherein said cut-out opening is at least as long or as wide as said product with which said guides are in contact thereby permitting rotation of said product to be carried out without interrupting transport of said product on said transporter.

19. A method comprising conveying products on a base that stands on a transporter that defines a transport plane that supports said base and that conveys said base with said products arranged thereon, said base having an upper side on which said product is conveyed, a lower side, and a thickness defined by said upper and lower sides, wherein conveying said products comprises positioning a gripper that comprises a gripping unit above said products, said gripping unit comprising a guide above said products, said guide having guide surfaces, causing said guide surfaces to extend into a recess below said transport plane through a cut-out opening so as to be beneath said lower side of said base, pivoting said gripping unit for engaging with said products, and rotating said product about a vertical axis thereof.

20. The method of claim 19, further comprising raising said gripping unit until said base contacts an upper side of a finger of said gripping unit.

21. The method of claim 19, further comprising raising said gripping unit until said base is secured by the weight of at least one product on said base.

22. The method of claim 19, further comprising securing a finger of said gripping unit to said base.

* * * * *